United States Patent [19]

Hildebrand

[11] 4,426,172

[45] Jan. 17, 1984

[54] BALL AND SOCKET JOINT FOR DUMPER TRUCKS

[76] Inventor: Karl Hildebrand, Bessemerstrasse 9, D-4006 Erkrath, Fed. Rep. of Germany

[21] Appl. No.: 384,225

[22] Filed: Jun. 2, 1982

[51] Int. Cl.$^3$ ............................................. F16C 11/06
[52] U.S. Cl. ................................... 403/122; 403/141; 403/143; 403/316; 298/17.5; 280/512
[58] Field of Search ............... 280/512, 511; 298/17.5, 298/17.6, 17.7, 17.8; 403/143, 141, 122, 316, 317, 325

[56] References Cited

U.S. PATENT DOCUMENTS 3,770,300 11/1973 Shepherd ............................ 280/511
4,241,936 12/1980 Carruthers et al. ............. 280/511 X

FOREIGN PATENT DOCUMENTS 308084 3/1933 Italy ..................................... 280/511
444106 3/1936 United Kingdom ................. 280/511

*Primary Examiner*—Andrew V. Kundrat
*Assistant Examiner*—Joseph A. Fischetti
*Attorney, Agent, or Firm*—Holman & Stern

[57] ABSTRACT

A ball and socket joint for supporting the body of a dumper truck has an upright stem, designed to be fixed to the body of the truck, with a ball head positioned in a socket on the chassis of the truck so that the stem is upright when the body is horizontal. The socket has two or three cutouts in its upper edge for receiving the stem of the ball when the body of the truck is in any one of the positions of dumping. On the side of the socket having no such cutout, the socket has a keeper nosepiece extending outwardly therefrom which, in turn, pivotally supports a locking lever which has a spring for forcing it against the ball within the socket to lock it in position. The springs are generally upright and have their top ends joined with a top end of the locking lever and their lower ends joined with a part of the socket so that the locking part is levered about a turnpin of the pivotal support offset from a straight line joining the ends of the springs. The locking part is made to be weighted on one-side with respect to the turnpin supporting it so that, even without the effect of the springs, it would be kept lockingly rested against the ball of its own weight.

4 Claims, 6 Drawing Figures

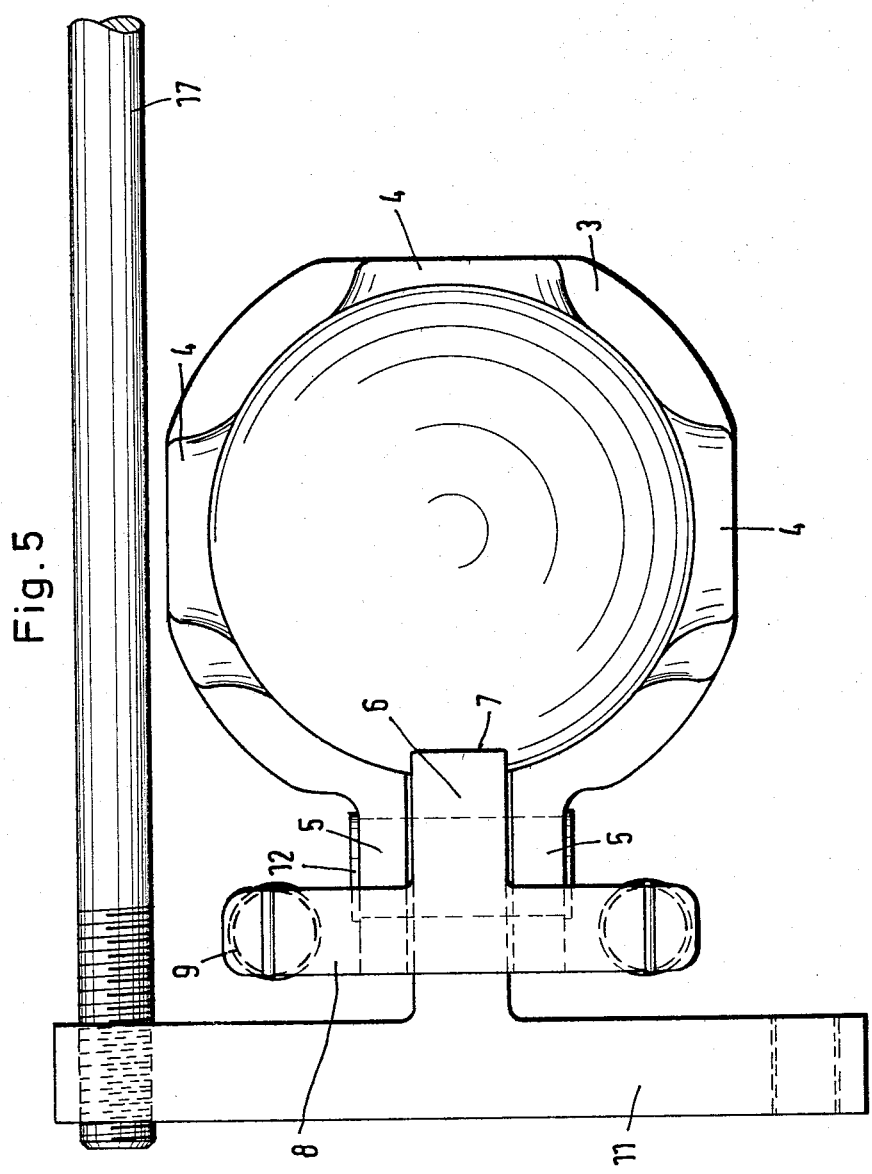

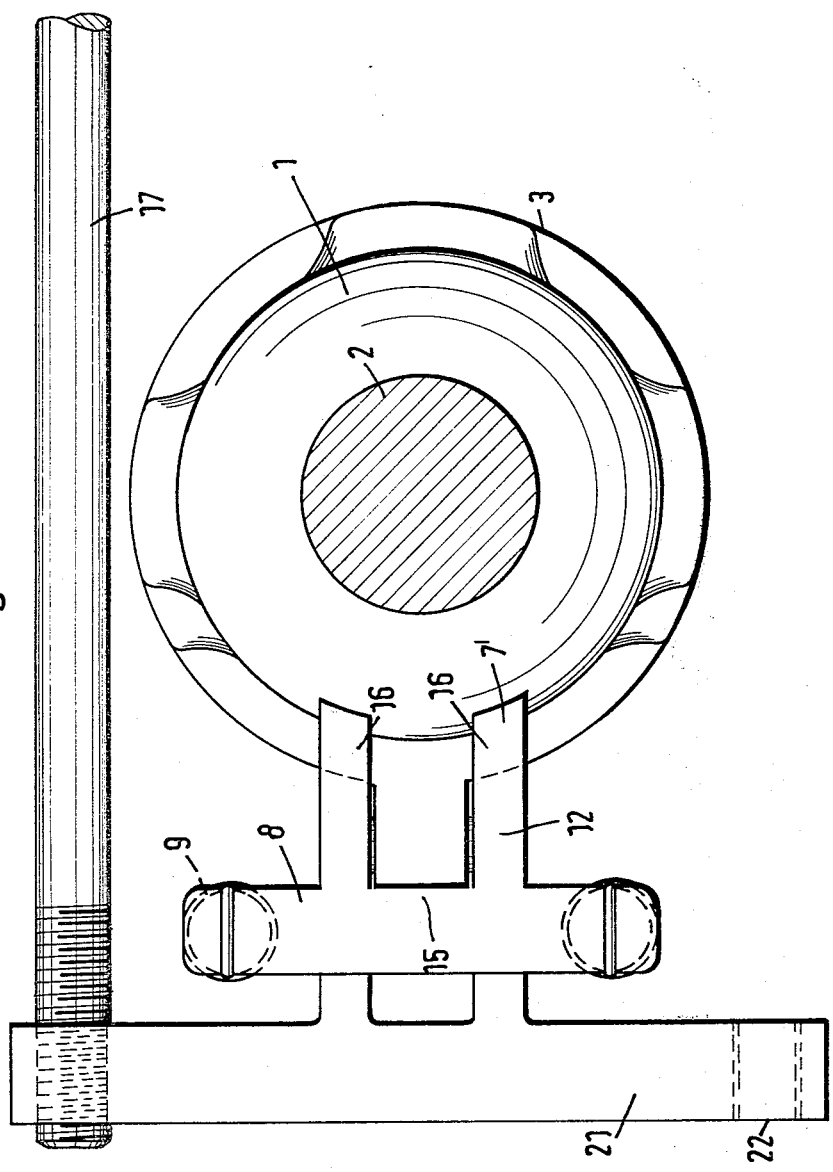

BALL AND SOCKET JOINT FOR DUMPER TRUCKS

FIELD OF THE INVENTION

The present invention relates to a ball and socket joint for supporting a dump truck body so that the body may be rocked about at least two axes for dumping, the socket being in cross-section half-circular and having a keeper part for keeping the ball in position.

DESCRIPTION OF THE PRIOR ART

Ball and socket joints for dump trucks designed for dumping in two or three directions, are, as a rule, placed at the four corners of the body. In the case of known ball and socket joints the stem fixed to the ball is generally horizontal and is fixed to the frame of the truck while the socket is fixed to a bridgepiece, which may be turned about the ball when dumping takes place.

However, known ball and socket joints have a number of shortcomings. Although such joints have frequently been lined with synthetic resin, and new linings may be put in, rough conditions of use on driving the truck are responsible for such synthetic resin linings being quickly worn so that the ball and socket joint then becomes noisy. Furthermore, because known ball and socket joints have to have a locking cotter pin, fixed to a chain, such ball and socket joints are not readily used and worked. A further shortcoming is that because the ball stem is horizontal, it is acted on by great forces and after becoming worn, may be broken off.

SUMMARY OF THE INVENTION

One purpose of the present invention is the development of a ball and socket joint for a dump truck in which there is no need of a cotter pin and a special chain for stopping loss thereof.

A further purpose of the invention is to provide a ball and socket joint which is not in need of any upkeep of parts to prevent undesired noise.

In this respect one important idea on which the present invention is based is that the best design is generally one in which the stem of the ball is upright in the resting position, that is to say when the truck body is horizontal.

The ball and socket joint of the present invention may be characterized in that the ball stem is in an upright position when the body of the dump truck is horizontal, and the socket has a top edge with part-circular cutouts on at least two and, more specially, three sides, such cutouts being for guiding the stem when dumping material from the truck. Furthermore, the socket has a keeper nosepiece on at least one side thereof, in whose top part there is at least one locking part which is pivotally supported and which has a locking face designed to be rested against the ball in the well of the socket, the locking part having at the top part thereof a crosspiece running out to the two sides of the locking part. Furthermore, there are two springs with top ends joined symmetrically with the crosspiece of the locking part, while lower ends of the springs are joined up with the socket so that by the effect of such springs, the locking part is forced against the ball within the well of the socket.

In the case of a preferred embodiment of the invention, the keeper part for keeping the ball within the socket is made up of two spaced wings with one such locking part pivotally supported between them. In a further embodiment of the invention, having two locking parts, at least one such locking part has a T-like head running out to the two sides of the locking part and which may be acted upon by at least one turning rod for overcoming the locking effect so that the ball may be taken out of the socket. In a still further embodiment of the invention, the axis of rocking of the locking part is in such a position that because of the T-like headpiece it is, with respect to its turnpin, one-sided so that, even without any spring effect, the locking part is rested against the ball for automatically locking it.

The useful effect produced by the present invention is the fact that the upkeep on the ball and socket joint is very cheap on. A further useful efect is that, unlike known ball and socket joints, there is no need to have chains and cotters or the like. A further specially useful effect is produced because there are two parallel springs for forcing the locking part against the ball. If one spring becomes broken, the other spring will be strong enough for forcing the ball into the well of the socket. Furthermore, even if the two springs are broken, the ball will still be locked in position because of the special design of the locking part.

A further useful engineering effect is that the general design of the ball and socket joint is such that the ball with the stem may be moved, that is to say turned, in three directions, the stem being guided and positioned at the side of the socket.

BRIEF DESCRIPTION OF THE DRAWINGS

A detailed description will now be given of the invention with reference to the accompanying drawings wherein;

FIG. 5 is a plan view of the socket without the ball in position, and FIG. 6 is a plan view of a second embodiment of the invention.

DETAILED DESCRIPTION

Figure 1:
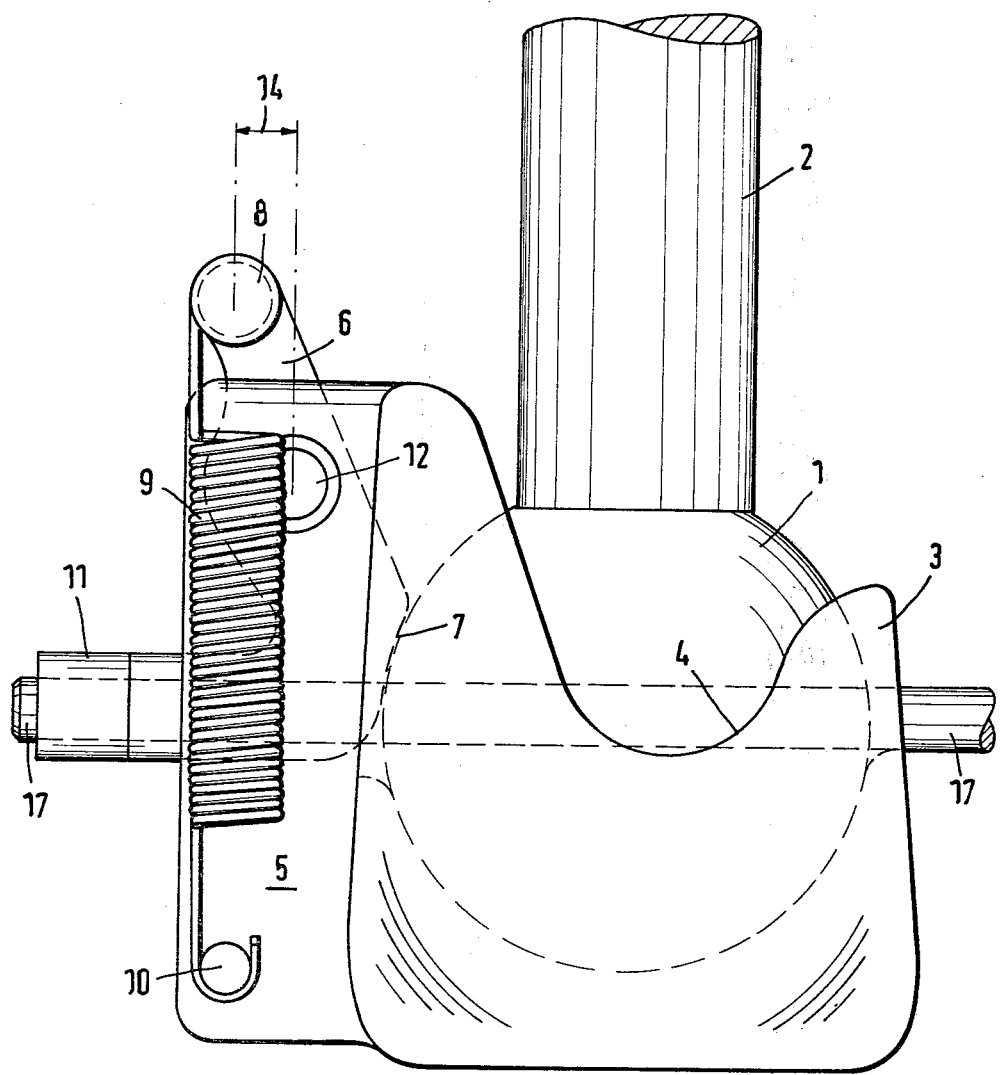
FIG. 1 is a side elevational view of one ball and socket joint with the ball in position.
Figure 2:
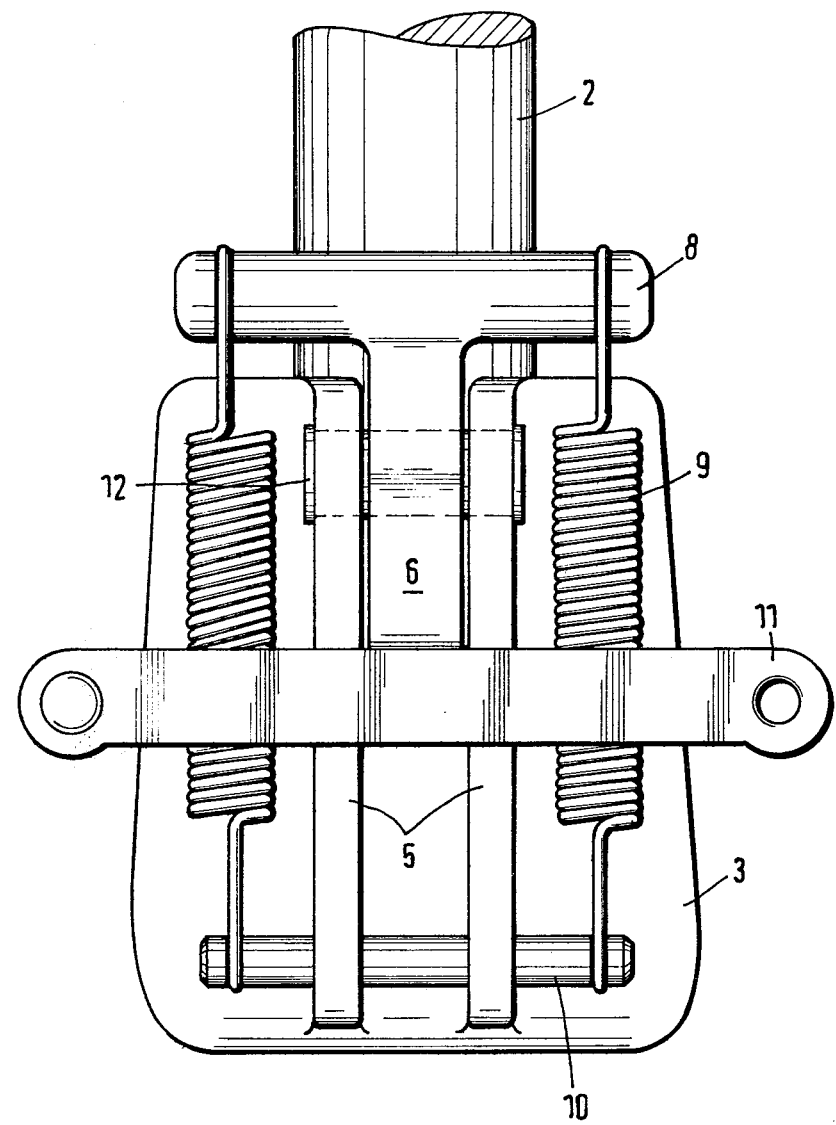
FIG. 2 is a front elevational view of the ball and socket joint of FIG. 1 without showing the ball in position.
Figure 3:
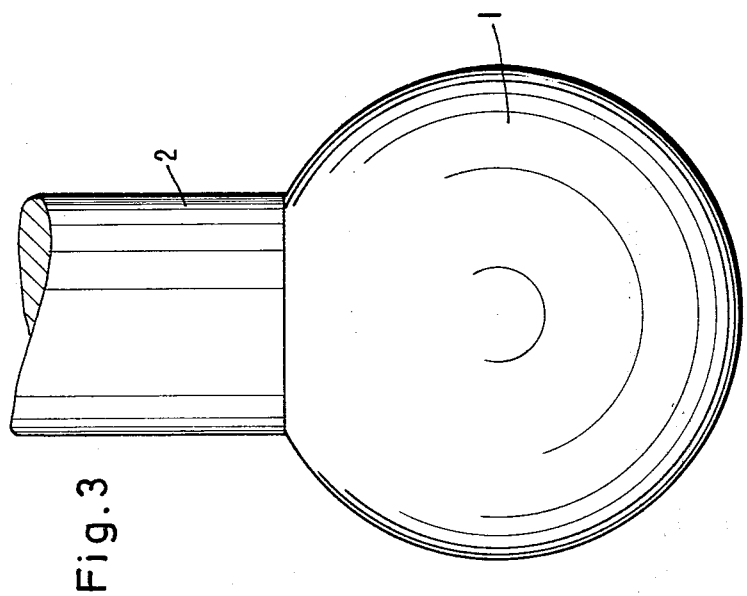
FIG. 3 is an elevational view showing the design of the ball with its stem.
Figure 4:
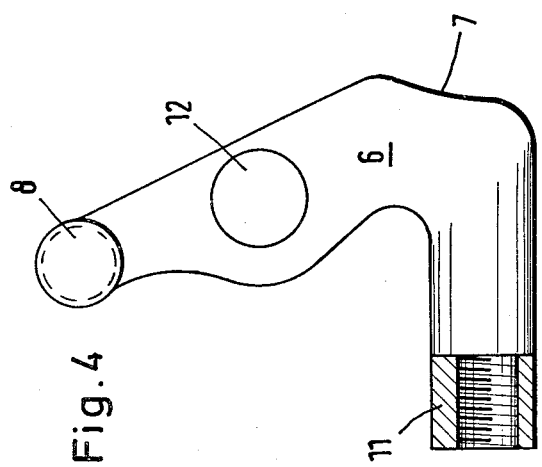
FIG. 4 is a partly elevational and partly cross-sectional view of the locking part.

In the embodiment of FIGS. 1 to 5 the ball is numbered 1 and the stem or pin is numbered 2. Ball 1 is supported in the well of a socket 3, such well being in cross-section half-circular. The socket has pieces running upwards from the equator of the ball in the form of a socket top edge with half-circular cutouts 4 for sideways guiding of the ball stem when the stem is moved in anyone of three directions. The socket 3 has on a further side an outwardly running keeper nosepiece 5 made up of two spaced wings in whose top part a locking part 6 is pivotally supported by way of a turnpin 12. The locking part 6 has a locking face 7 for resting against the ball when it is in the socket 3. At its top end, locking part 6 has a crosspiece, sticking out to the two sides of the locking part so as to give a sort of T-like structure with the ends of the crosspiece forming spring fixing pins 8, which, looking at the left hand side of FIG. 1, are distance 14 in front of the turnpin 12. As will be seen from FIG. 2, springs 9 are placed symmetrically in relation to the locking part 6 with their top ends engaging around the two spring fixing pins 8 for forcing the locking part 6 against ball 1. The lower ends of the springs 9 are hooked around the pin 10 in the lower part of keeper nosepiece 5. The adjustment of the springs is such that the locking part 6 is forced against the ball 1 with the necessary pressure.

The locking part 6 has on its outer side a T-like head 11, running out to the two sides of the locking part 6 horizontally. The head 11 has a rod 17 threadedly engaging an outer end thereof so that it may be removed therefrom and which may be used for pivoting the locking part 6 about pin 12 to release locking face 7 from the ball 1 when the ball is to be freed from its socket. Turnpin 12 of the locking part 6 is so positioned that, because of the position of the T-like headpiece 11, locking part 6 is one-sided with respect to its turnpin so that the greatest part of its weight is on the outer side of the turnpin 12 with the result that, even if the springs are not used, the locking part 6 is forced against the ball to automatically lock it in socket 3 and there is no chance of it slipping or jumping out of position.

FIG. 6 is a view of a second embodiment of the invention in which the keeper nosepiece 15 is made up of a single wing and the locking part comprises two spaced wing type locking parts 16 symmetrically positioned on the two sides of nosepiece 15 and pivotally supported by a turnpin 12. The locking parts 16 are designed for resting against the ball and locking it in the well. At the outer ends of the locking part 16 there is again T-like headpiece 21 or rod, which, at its ends, has threaded openings 22 to engage threaded rods 17 used for unlocking the ball 1. The arms 8 are again engaged at their ends by helical springs 9 for urging the locking faces 7' of parts 16 against the ball 1.

I claim:

1. In a ball and socket joint for supporting a dump truck body so that said body may be rocked about at least two axes for dumping, having a stem with a ball fixed thereto, and a socket having a well for receiving said ball, said well generally conforming to the form of said ball, the improvement comprising said stem is fixed to said body so that said stem is generally upright when said body is in its non-dumping condition, an upper edge on said socket extending around said well, at least two cutouts in said edge of part-circular form for receiving said stem when said body is in a dumping position, a keeper nosepiece extending out from one side of said socket, at least one locking part pivotally mounted on said nosepiece so that it can be turned into and out of a ball-locking position, a locking face on said locking part operatively engaging against said ball for locking the ball in said well in said locking position, a crosspiece formed at the top end of said locking part, two springs symmetrically disposed on two opposite sides of said locking part, the lower ends of said springs being attached to said socket and the top ends of said springs being attached to said crosspiece to resiliently urge said locking face of said locking part against said ball.

2. The ball and socket joint as claimed in claim 1 wherein said keeper nosepiece comprises two spaced wings and said locking part is disposed between said wings.

3. The ball and socket joint as claimed in claim 1 or claim 2, wherein said locking part has a T-shaped headpiece extending out beyond the sides thereof and adapted to move said locking part clear of said ball by a force thereon for unlocking the ball.

4. The ball and socket joint as claimed in claim 1 or claim 2 wherein said locking part has its weight distribution offset in relation to the pivotal axis thereof so that even without the effect of said springs, said locking face is urged by the weight of the locking part against said ball for automatically locking said ball.

* * * * *